US012222428B2

(12) United States Patent
Lee et al.

(10) Patent No.: US 12,222,428 B2
(45) Date of Patent: Feb. 11, 2025

(54) METHOD FOR MODULATING VARIABLE BINARY OFFSET CARRIER WITH DISCRETE TIME-VARIANT FREQUENCY, AND SATELLITE NAVIGATION SIGNAL GENERATOR USING THE SAME

(71) Applicants: ELECTRONICS AND TELECOMMUNICATIONS RESEARCH INSTITUTE, Daejeon (KR); Korea Advanced Institute of Science and Technology, Daejeon (KR)

(72) Inventors: Sang Uk Lee, Daejeon (KR); Seung Hyun Kong, Daejeon (KR); Sang Jae Cho, Daejeon (KR); Tai Sun Kim, Daejeon (KR); Seung Hwan Chung, Seongnam (KR)

(73) Assignees: ELECTRONICS AND TELECOMMUNICATIONS RESEARCH INSTITUTE, Daejeon (KR); Korea Advanced Institute of Science and Technology, Daejeon (KR)

( * ) Notice: Subject to any disclaimer, the term of this patent is extended or adjusted under 35 U.S.C. 154(b) by 443 days.

(21) Appl. No.: 17/695,711

(22) Filed: Mar. 15, 2022

(65) Prior Publication Data
US 2022/0299654 A1    Sep. 22, 2022

(30) Foreign Application Priority Data

Mar. 16, 2021    (KR) .......................... 10-2021-0034280
Mar. 15, 2022    (KR) .......................... 10-2022-0032304

(51) Int. Cl.
*G01S 19/25*    (2010.01)
*G01S 19/32*    (2010.01)
(Continued)

(52) U.S. Cl.
CPC ............ *G01S 19/256* (2013.01); *G01S 19/32* (2013.01); *G01S 19/40* (2013.01); *G01S 19/44* (2013.01)

(58) Field of Classification Search
None
See application file for complete search history.

(56) References Cited

U.S. PATENT DOCUMENTS 7,916,771 B2 * 3/2011 Julien ..................... G01S 19/30
   342/357.22
8,509,286 B2 * 8/2013 Hodgart .................. G01S 19/24
   375/147

(Continued)

FOREIGN PATENT DOCUMENTS

KR    100835891 B1    6/2008
KR    20140068432 A    6/2014
(Continued)

*Primary Examiner* — Adolf Dsouza

(57) ABSTRACT

Provided herein are a method for modulation of a variable binary offset carrier (VBOC) having a discrete time-variant frequency and a satellite navigation signal generator using the same. The method for modulation of a VBOC having a discrete time-variant frequency may comprise: generating navigation message data; generating a carrier; generating a VBOC subcarrier; generating a pseudo-random code; synthesizing the pseudo-random code and the VBOC subcarrier; and synthesizing a synthesized signal of the pseudo-random code and the VBOC subcarrier, the carrier, and the navigation message data.

12 Claims, 7 Drawing Sheets

(51) Int. Cl.
    *G01S 19/40*           (2010.01)
    *G01S 19/44*           (2010.01)

(56) References Cited

U.S. PATENT DOCUMENTS

| | | | | |
|---|---|---|---|---|
| 8,649,415 | B2 * | 2/2014 | Pratt | G01S 19/01 |
| | | | | 375/146 |
| 8,964,813 | B2 * | 2/2015 | Hodgart | G01S 19/24 |
| | | | | 375/150 |
| 9,172,524 | B2 * | 10/2015 | Yoon | H04B 1/7085 |

FOREIGN PATENT DOCUMENTS

| | | | | |
|---|---|---|---|---|
| KR | 20150056279 A | | 5/2015 | |
| RU | 2349049 C2 | * | 3/2009 | ............ G01S 19/30 |
| WO | 2006/075018 A1 | | 7/2006 | |

* cited by examiner

METHOD FOR MODULATING VARIABLE BINARY OFFSET CARRIER WITH DISCRETE TIME-VARIANT FREQUENCY, AND SATELLITE NAVIGATION SIGNAL GENERATOR USING THE SAME

CROSS-REFERENCE TO RELATED APPLICATIONS

This application claims priority to Korean Patent Applications No. 10-2021-0034280 filed on Mar. 16, 2021, and No. 10-2022-0032304 filed on Mar. 15, 2022 with the Korean Intellectual Property Office (KIPO), the entire contents of which are hereby incorporated by reference.

BACKGROUND

1. Technical Field

Exemplary embodiments of the present disclosure relate to a technique for modulating a satellite navigation signal, and more particularly to, a method for generating a modulation signal by sweeping a frequency of a binary offset carrier (BOC) having a discrete time-variant frequency, and a satellite navigation signal generator using the same.

2. Related Art

Currently, a global navigation satellite system (GNSS) such as a global positioning system (GPS) is being widely used. In the existing GNSS, navigation messages are transmitted using binary-phase shift-keying (BPSK) and binary offset carrier (BOC) modulation techniques based on code division multiple access (CDMA).

Meanwhile, frequency bands allocated to navigation satellite signals are being saturated due to the existing GNSS currently in commercial use or various modulation techniques planned for GNSS modernization, and patent costs due to the use of the existing satellite navigation signal system are expected to occur. It is necessary to study satellite navigation signal systems using new techniques to avoid performance degradation and regulation due to the influence of mutual interferences with the existing system and to increase the positioning performance in an urban area where positioning performance is rapidly degraded.

In addition, the development of GNSS satellite navigation systems in countries around the world is overheating. As GNSS signals are oversaturated in the satellite navigation signal band, it is becoming important to consider the influence of interferences between the GNSS signals. In addition, it is very important to improve positioning accuracy in an urban area where location-based services are rapidly increasing due to the increase of people living in cities.

However, although several research and development results for technologies for minimizing the influence of interferences on the existing signals and improving positioning accuracy have appeared, there has been no attempt to change the satellite navigation signal itself. As described above, unless a satellite navigation system of a new direction is not developed, there is a limit to the development of a technology that improves positioning performance while avoiding influences of interferences because positioning technology should be developed focusing on the existing GNSS signal.

SUMMARY

Accordingly, exemplary embodiments of the present disclosure are provided to substantially obviate one or more problems due to limitations and disadvantages of the related art, and the exemplary embodiments of the present disclosure provide methods for modulating a discrete binary offset carrier by using a discrete time-variant frequency, which can minimize the influences of interferences and improve positioning accuracy.

According to an exemplary embodiment of the present disclosure, a method for modulation of a variable binary offset carrier (VBOC) having a discrete time-variant frequency may comprise: generating navigation message data; generating a carrier; generating a VBOC subcarrier; generating a pseudo-random code; synthesizing the pseudo code and the VBOC subcarrier; and synthesizing a synthesized signal of the pseudo code and the VBOC subcarrier, the carrier, and the navigation message data.

The generating of the VBOC subcarrier may comprise multiplying an original signal by a square wave with a specific fixed frequency.

The generating of the VBOC subcarrier may comprise discretely increasing or decreasing a frequency of a binary offset carrier (BOC) signal over time for a specific period.

A start frequency, an end frequency, and a frequency interval of the frequency of the BOC signal may be control parameters configured for the modulation.

According to another exemplary embodiment of the present disclosure, a satellite navigation signal generator performing modulation of a VBOC having a discrete time-variant frequency may comprise a processor; and a memory storing program instructions executable by the processor, wherein when executed by the processor, the program instructions cause the processor to: generate navigation message data; generate a carrier; generate a VBOC subcarrier; generate a pseudo-random code; synthesize the pseudo code and the VBOC subcarrier; and synthesize a synthesized signal of the pseudo code and the VBOC subcarrier, the carrier, and the navigation message data.

In the generating of the VBOC subcarrier, the program instructions may cause the processor to multiply an original signal by a square wave with a specific fixed frequency.

In the generating of the VBOC subcarrier, the program instructions may cause the processor to discretely increase or decrease a frequency of a binary offset carrier (BOC) signal over time for a specific period.

A start frequency, an end frequency, and a frequency interval of the frequency of the BOC signal may be control parameters configured for the modulation.

According to yet another exemplary embodiment of the present disclosure, a satellite navigation signal generator performing modulation of a VBOC having a discrete time-variant frequency may comprise: a navigation message generating unit configured to generate navigation message data; a carrier generating unit configured to generate a carrier; a VBOC subcarrier generating unit configured to generate a VBOC subcarrier; a pseudo-random code generating unit configured to generate a pseudo-random code; a first synthesizing unit configured to synthesize the pseudo code and the VBOC subcarrier; and a second synthesizing unit configured to synthesize a synthesized signal of the pseudo code and the VBOC subcarrier, the carrier, and the navigation message data.

The VBOC subcarrier generating unit may multiply an original signal by a square wave with a specific fixed frequency.

The VBOC subcarrier generating unit may discretely increase or decrease a frequency of a binary offset carrier (BOC) signal over time for a specific period.

A start frequency, an end frequency, and a frequency interval of the frequency of the BOC signal may be control parameters configured for the modulation.

According to the exemplary embodiments of the present disclosure, positioning performance can be significantly improved in most of the newly released GNSS receivers as well as the existing GNSS receivers. In particular, using the exemplary embodiments of the present disclosure, a variant frequency pattern can be easily estimated only by one-time inference by increasing the existing BOC signal to the maximum frequency or decreasing it to the minimum frequency at a predetermined constant time interval based on an algorithm for identifying a frequency that varies discretely during a certain period. Accordingly, a VBOC modulation method having similar or improved performance while using a transmitter and a receiver having lower complexity than the prior arts can be provided.

DETAILED DESCRIPTION OF THE EMBODIMENTS

Figure 1:
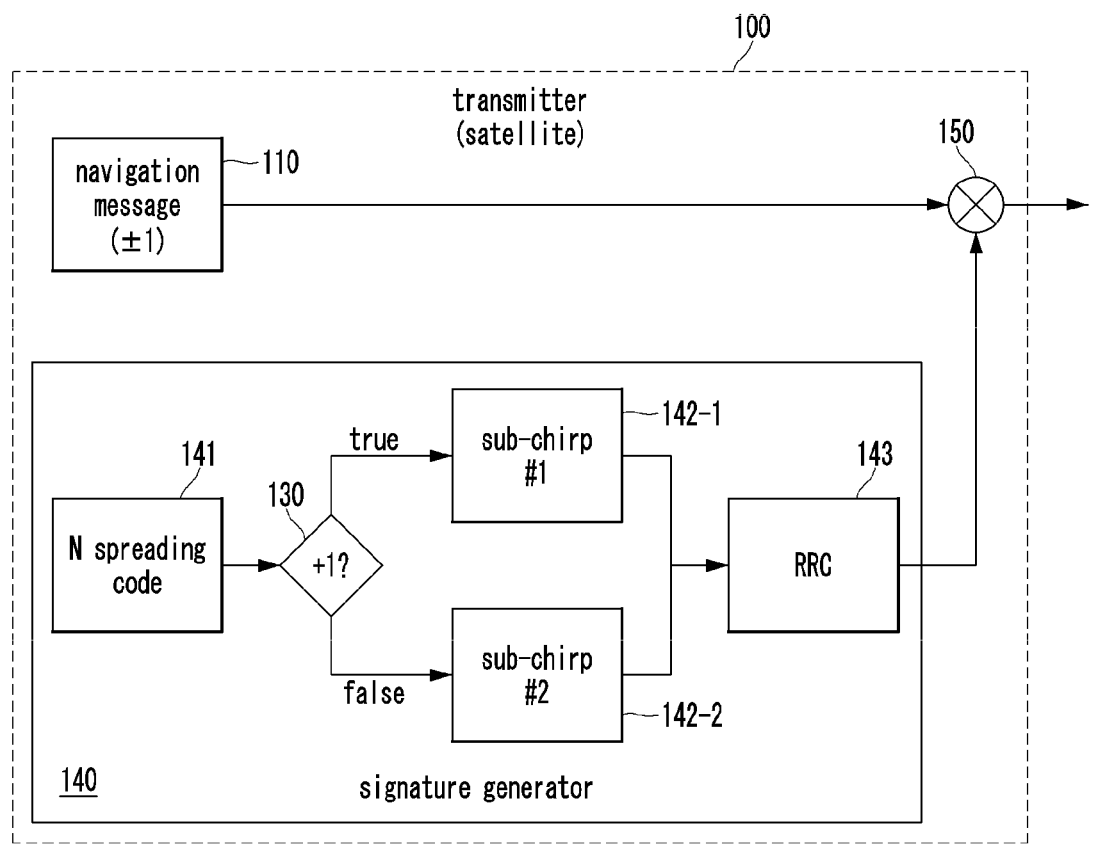
FIG. 1 is a block diagram illustrating a satellite navigation signal generator according to a comparative example.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system or a memory system to which exemplary embodiments according to the present disclosure are applied will be described. The communication system or memory system to which the exemplary embodiments according to the present disclosure are applied is not limited to the contents described below, and the exemplary embodiments according to the present disclosure may be applied to various communication systems. Here, the communication system may be used in the same sense as a communication network.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated descriptions thereof will be omitted.

FIG. 1 is a block diagram illustrating a satellite navigation signal generator according to a comparative example.

Referring to FIG. 1, a satellite navigation signal generator 100 of a comparative example may be used for a satellite transmitter or the like. In the apparatus 100, 1 (true) or 0

(false) may be added to an N spreading code generated by a spreading code generating unit 141 through a voice data selective synthesizer 130, the N spreading code may be input to a sub-chirp #1 142-1 or a sub-chirp #2 142-2, and a signature code may be generated by passing a down-chirp signal and an up-chirp signal output respectively from the sub-chirp #1 and the sub-chirp #2 through a root raised cosine (RRC) window 143. The signature code generated by a signature code generator 140 may be used to spread a navigation message 110 through a synthesizer 150. Here, the two sub-chips (i.e., the sub-chirp #1 and the sub-chirp #2) may include a down chirp for sweeping from a high band to a low band and an up chirp for sweeping from a low band to a high band.

In the case of a chirp signal, since the frequency used varies with time, the influence of interferences may be significantly smaller than that of general satellite navigation signals. However, since the frequency of the chirp signal is continuously swept, an expensive receiver supporting a high sampling frequency is required when receiving the corresponding signal, and a low-cost receiver has a large error or cannot be used therefor.

In addition, when two types of sub-chirps are used according to a spreading code, the receiver should have a structure in which Doppler frequency detection for the two sub-chirps are processed, respectively, and thus an additional frequency phase detection algorithm for continuous frequency sweeping is required.

For example, a BOC subcarrier generated by a BOC modulation technique is multiplied with a binary phase shift keying (BPSK) signal to give an effect of offsetting an intermediate frequency of the existing BPSK signal. The BOC subcarrier is generated differently according to a square wave $f_S$ ($f_S=m/T_{CO}$ [Hz]) of a chip duration $T_C$ ($T_C=T_{CO}/n$, where $T_{CO}$ is $10^{-3}/1023$ [s]). In this case, the generated BOC subcarrier is divided into SinBOC($BOC_S$(m,n)) or CosBOC($BOC_C$(m,n)) according to a phase of the square wave. The BOC signal includes several square waves during a BPSK chip duration, thereby having an autocorrelation function (ACF) envelope having 2(2m/n−1) peaks, unlike a BPSK ACF envelope. Secondary peaks other than a primary peak may generate an error according to a multipath error envelope, thereby reducing the stability of the receiver with respect to multipath. Therefore, in order to reduce an error occurring in a multipath channel, a signal modulation technique for lowering a signal level or reducing the number of secondary peaks is required. In addition, most GNSS receivers do not implement relevant algorithms. In addition, since an expensive receiver having a very high sampling frequency is required to detect a continuous frequency change, a usage domain thereof may be considerably limited.

Therefore, exemplary embodiments of the present disclosure are proposed based on a scheme of combining the chirp spreading technique of the comparative example, which maximizes the autocorrelation characteristics of signals by continuously sweeping the frequency with time, and the frequency hopping technique, which varies the frequency discretely with time by discretely changing the frequency pseudo-randomly. Accordingly, in exemplary embodiments of the present disclosure, a BOC modulation technique of dividing the intermediate frequency by multiplying an original signal by a square subcarrier may achieve the effect of offsetting the frequency similar to that of a sine wave.

The present disclosure is based on the BOC subcarrier applied to avoid the influence of inter-signal interferences in the existing GNSS satellite navigation system. The BOC subcarrier is a modulation technique that multiplies an original signal by a square wave having a specific fixed frequency. The variable BOC modulation technique according to the present disclosure can increase or decrease the frequency of the BOC signal discretely according to time during a specific period, thereby increasing the autocorrelation characteristic of the signals and making the influence of interferences relatively less than that of the existing signals. In addition, the exemplary embodiment according to the present disclosure can be robust against noise and multipath because it exhibits inherent correlation characteristics of signals over time.

Figure 2:
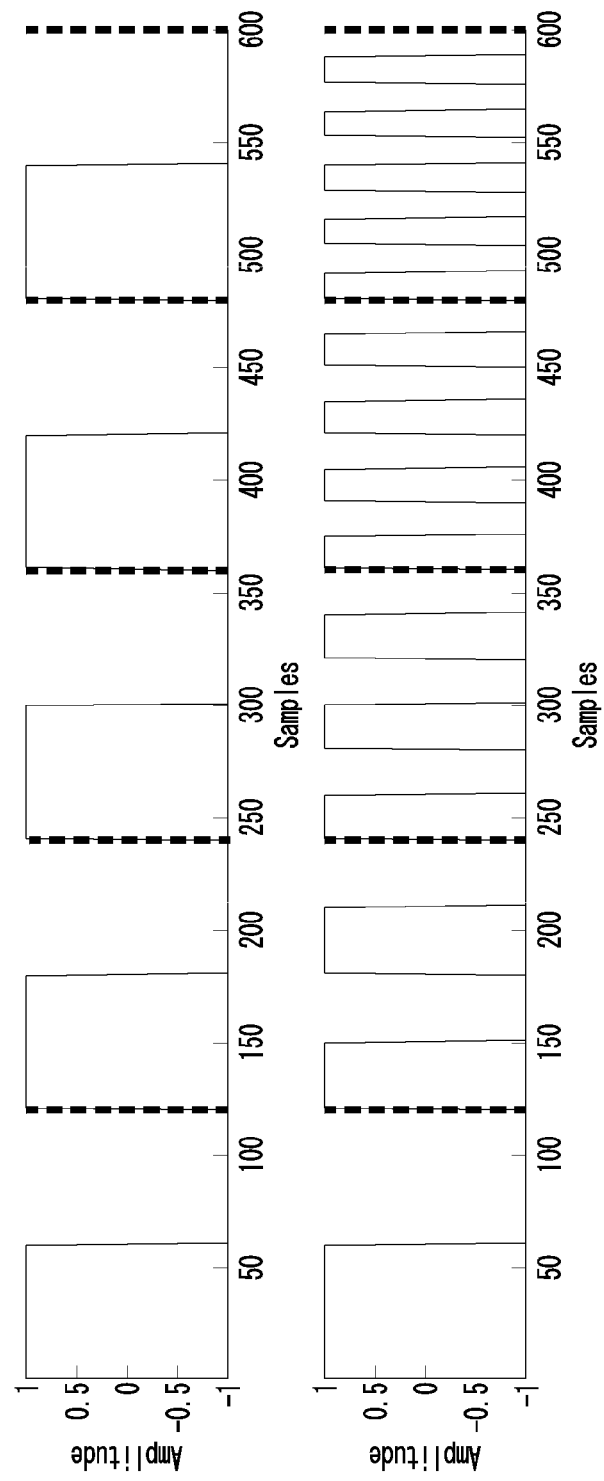
FIG. 2 is a diagram illustrating a structure of a satellite navigation signal generator according to an exemplary embodiment of the present disclosure and a variable BOC (VBOC) subcarrier generated by the generator.
Figure 3:
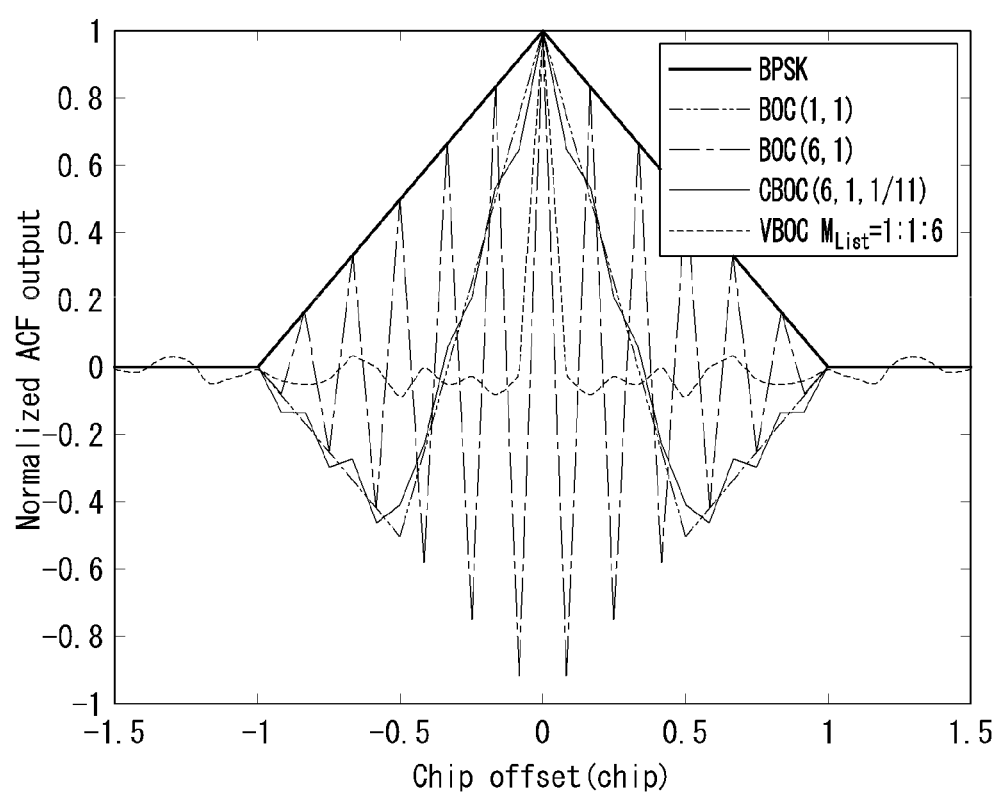
FIG. 3 is an exemplary diagram illustrating a VBOC signal usable by the satellite navigation signal generator of FIG. 2 and a BOC signal of the comparative example.

FIG. 2 is a diagram illustrating a structure of a satellite navigation signal generator according to an exemplary embodiment of the present disclosure and a variable BOC (VBOC) subcarrier generated by the generator. FIG. 3 is an exemplary diagram illustrating a VBOC signal usable by the satellite navigation signal generator of FIG. 2 and a BOC signal of the comparative example.

Referring to FIG. 2, a satellite navigation signal generator 200 may be used for a satellite receiver or the like. The satellite navigation signal generator 200 may comprise a navigation message processing unit 10, a carrier generating unit 20, a subcarrier generating unit 30, a pseudo-random code generating unit 40, a first synthesizing unit 50, and a second synthesizing unit 60.

The navigation message processing unit 10 may generate navigation message data. The carrier generating unit 20 may generate a carrier. The subcarrier generating unit 30 may generate a VBOC subcarrier. The VBOC subcarrier may be generated by multiplying an original signal by a square wave having a discrete time-variant frequency. Such the VBOC subcarrier modulation method may increase or decrease the frequency of the BOC signal with time for a specific period to increase the autocorrelation characteristics of the signal.

The pseudo-random code generating unit 40 may generate a pseudo-random code. The first synthesizing unit 50 may synthesize the pseudo-random code and the VBOC subcarrier. In addition, the second synthesizing unit 60 may generate a VBOC-modulated spread spectrum navigation message signal by synthesizing the synthesized signal of the pseudo-random code and the VBOC subcarrier, the carrier, and the navigation message. Unlike frequency hopping, the discrete time-variant frequency of the exemplary embodiment has a pattern of increasing or decreasing at regular frequency intervals. In this case, a start frequency, an end frequency, and the frequency interval thereof may be control parameters that are configurable in the modulation method of the present exemplary embodiment.

As described above, the navigation satellite signal generator according to the present exemplary embodiment may generate the VBOC-modulated spread signal using a square wave having a discrete time-varying frequency, that is, a VBOC signal, rather than a square wave having a fixed frequency in BOC modulation of the GNSS signal. The BOC signal may refer to the left or upper signal of FIG. 3, and the VBOC signal may refer to the right or lower signal of FIG. 3, respectively. Here VBOC is VBOC(1:1:6,1) (i.e., M_List={1:1:6}, chip rate is 1.023 MHz), considering the currently being serviced GNSS signals in L1 band.

A usual method to analyze code-lock performance in a multipath channel environment by using one reflection path is to generate a multipath error envelope. The multipath error envelope may be expressed by providing, for each reflected path delay (excess delay) value, a maximum code phase error obtained with a given code discriminator, such as an early-late (EL) discriminator.

Figure 4:
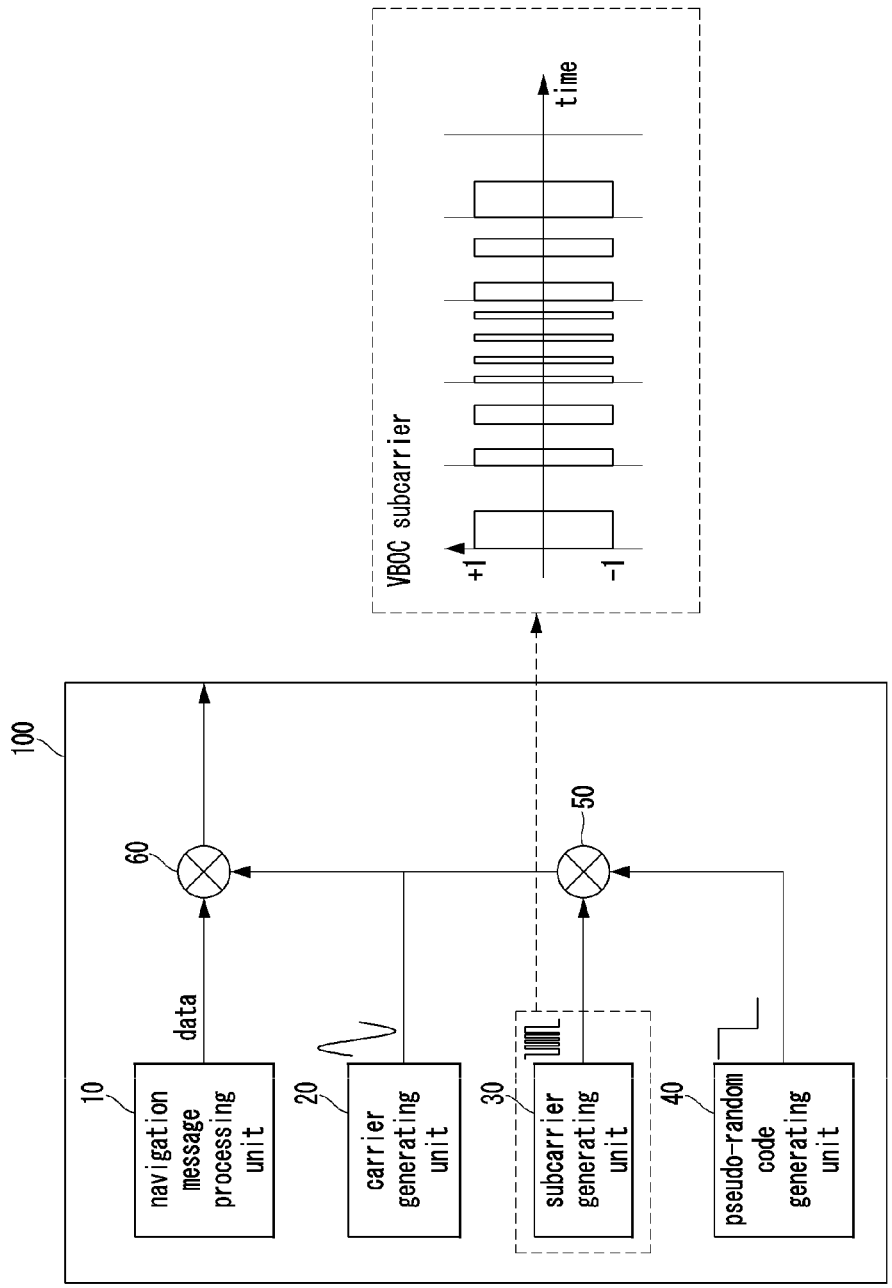
FIG. 4 is a graph illustrating a comparison between a normalized power spectrum density (PSD) of the VBOC signal generated by the satellite navigation signal generator of FIG. 2 and a PSD of the GNSS signal of the comparative example.

FIG. 4 is a graph illustrating a comparison between a normalized power spectrum density (PSD) of the VBOC(1:1:6,1) signal generated by the satellite navigation signal generator of FIG. 2 and a PSD of the GNSS signal of the comparative example.

Referring to FIG. 4, assuming that the VBOC(1:1:6,1) signal of the present exemplary embodiment proposed as a new GNSS signal is operated in an L1 band, for comparison with signals of other GNSS systems operating in the L1 band, the VBOC(1:1:6,1) signal with a power normalized to 1 over a 20 MHz bandwidth is shown in the L1 band. That is, FIG. 4 shows multi-path error envelopes of the VBOC (1:1:6,1) signal of the present exemplary embodiment with a bandwidth B of 20 MHz and a chip spacing $\Delta$ of $0.1 \times T_{C0}$, and the BPSK(1), CBOC(6,1,1/11), PBPSK(10), MBOC(10, 5), and BOC signals of the comparative example.

Looking at the normalized PSD of the VBOC(1:1:6,1) signal, it can be seen that it affects almost all regions of the L1 band, except the intermediate frequency. On the other hand, the VBOC(1:1:6,1) signal, unlike the signals of other satellite navigation systems of the comparative example, has different frequency bands according to time and is evenly distributed over the entire band, so it is expected that the influence of interferences on a specific GNSS system is not strong. When expressed numerically using a spectrum separate coefficient (SSC) indicating how much the frequency overlaps between signals in a frequency band, the SSC may be expressed as in Equation 1.

$$K_{id} = \int_{-B_d}^{B_d} G_i(f) G_d(f) df \quad \text{[Equation 1]}$$

In Equation 1, $G_i$ may be a corresponding signal, $G_d$ may be a PSD of a counterpart signal, and $K_{id}$ may represent an SSC between the corresponding signal and the counterpart signal.

There are other signals operating in the L1 band, but in the case of CosBOC (15, 2.5), since the PSD is placed outside the previously set 20 MHz bandwidth, the SSC is expected to be significantly lower, so it was not considered. Therefore, the SSC is analyzed for signals existing within the 20 MHz bandwidth where the VBOC(1:1:6,1) signal is expected to be affected by interference, and the results of the analysis are shown in Table 1.

TABLE 1

|  | BPSK(1) | BPSK(10) | CBOC (6.1.1/11) | BOCs (10.5) | VBOC (1:1:6.1) |
|---|---|---|---|---|---|
| BPSK(1) | −61.77 | −69.758 | −68.102 | −86.803 | −73.622 |
| BPSK(10) | −69.758 | −70.984 | −70.26 | −79.269 | −71.644 |
| CBOC (6.1.1/11) | −68.102 | −70.26 | −65.376 | −81.502 | −71.109 |
| BOCs (10.5) | −86.803 | −79.269 | −81.502 | −70.869 | −79.261 |
| VBOC (1:1:6.1) | −73.622 | −71.644 | −71.109 | −79.261 | −71.278 |

As described above, the satellite navigation signal generator according to the present exemplary embodiment may change the frequency interval and the minimum/maximum frequency when increasing and decreasing the frequency of the VBOC subcarrier. This may be expressed as the PSD as shown in FIG. 4. The case shown in FIG. 4 corresponds to a PSD when the VBOC(1:1:6,1) signal of the present exemplary embodiment is added to the L1 band, where the current GNSS signals enter the most. In the case of the VBOC(1:1:6,1) signal expressed in the PSD, it may vary discretely by 1 MHz from 1 MHz to 6 MHz in consideration of the CBOC(6,1,1/11) signal having the widest main bandwidth in the L1 band.

The present exemplary embodiment provides a VBOC modulation method for a next-generation GNSS. The modulation method of the present exemplary embodiment is based on a BOC signal giving an effect of offsetting the intermediate frequency of the signal using a square wave and a chirp signal increasing or decreasing the frequency according to time.

In addition, in the modulation method of the present exemplary embodiment, the ACF envelope of the VBOC signal modulated with appropriate configuration of internal parameters may be sharper than the ACF envelopes of the signals generated using the existing signal modulation techniques and may have a very low level of secondary peaks. With these characteristics, the GNSS receiver can significantly reduce code delay errors in an acquisition phase and a tracking phase in a multi-channel environment occurring in urban areas.

In addition, when next-generation GNSS signals enter the existing band, they may be highly likely to be affected by interference from signals already in place. The existing signals sharing the same band avoid the influence of interferences by using the BOC signal to offset the intermediate frequency. However, in the case of the signal generated by the modulation method of the present exemplary embodiment, the frequency of the BOC signal varies for a certain short period of time unlike the existing signals, and thus a time for sharing the same frequency during the signal collection time is very short so that the influence of interference is very small.

In order to confirm this, multipath error envelopes of the existing signals and the VBOC signal of the present exemplary embodiment may be generated to identify their performances in the multipath channel, and influences of interferences may be analyzed by calculating SSCs between the VBOC signal and the signals in the L1 band.

A process of generating the VBOC-modulated spread signal by the satellite navigation signal generator according to the present exemplary embodiment described above will be described in more detail as follows.

Considering the chip duration, the square wave of the BOC modulation technique may be defined as in Equation 2.

$$y_{BOC}(t) = \text{sign}\{\sin(2\pi f_s t)\}, 0 \leq t \leq T_C, \quad \text{[Equation 2]}$$

The VBOC signal of the present exemplary embodiment increases or decreases m for an integer multiple of $T_{C0}$. The VBOC signal may be defined as BOC($M_{list}$,n), and $M_{list}$ may be defined as in Equation 3.

$$M_{list}(x) = \{s : q : f\} \quad \text{[Equation 3]}$$

where s, q, f are $\{1, 2, \ldots\}$ and x is $\{1, \ldots$ the size of $M_{list}\}$ In addition, the VBOC signal $y_{VBOC}$ or $y_{V-BOC(t)}$ expressed based on the BOC signal may be expressed as in Equation 4.

$$y_{V-BOC}(t) = \text{sign}\{\sin(2\pi M_{list}(x) f_{c0} t)\}, \quad \text{[Equation 4]}$$

$$0 \leq t \leq x \times T_{c0} / \left(\frac{f-s}{q}\right),$$

The VBOC signal may be generated as a combination of BOC signals in which every $$f_{sample} / \left( T_{c0} \times \left( \frac{f-s}{q} \right) \times t \right)$$

elements among (f−s)/q array elements of Mist repeat increase and decrease of the 1-th intermediate frequency for $$T_{c0} / \left( \frac{f-s}{q} \right)$$

with the same generation parameter $M_{list}(x)$, n. For example, a predetermined sampling frequency may use various combinations of $M_{list}$ arrays (e.g., changing values of VBOC generation parameter m such as {1:1:6}, {1:2:5}, or the like) for the entire 1 ms of 20 MHz.

That is, the VBOC modulation method of the present exemplary embodiment may generate the VBOC signal of a $M_{list}$ combination that achieves optimal performance according to the hardware specification or frequency allocation condition of the GNSS receiver. For example, the normalized ACF envelope of the VBOC signal of the present exemplary embodiment according to the $M_{list}$={1:1:6} (i.e., VBOC(1:1:6,1), which is the simplest combination, and the normalized ACF envelopes of the BPSK, BOC (1,1), BOC (6,1), and CBOC (6,1,1/11) may be represented as shown in FIG. 5.

Figure 5:
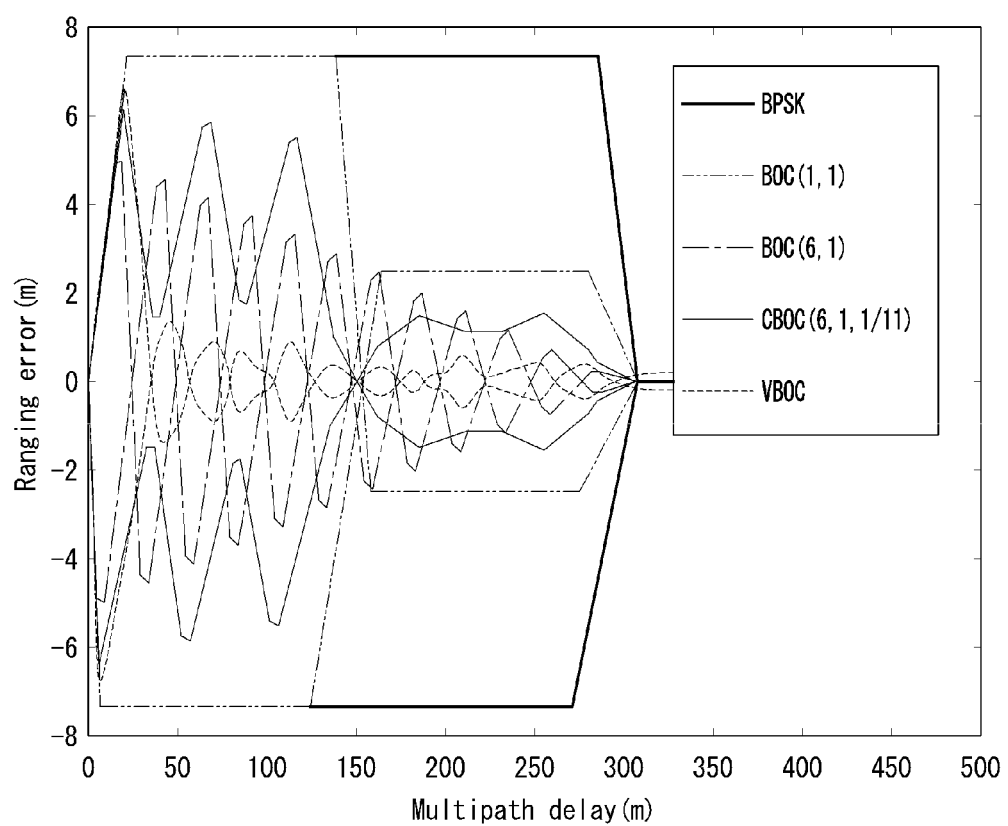
FIG. 5 is an exemplary diagram illustrating ACF envelopes that can be employed for the VBOC modulation of the satellite navigation signal generator of FIG. 2.

FIG. 5 is an exemplary diagram illustrating ACF envelopes that can be employed for the VBOC modulation of the satellite navigation signal generator of FIG. 2.

Referring to FIG. 5, the BOC (6,1) has the sharpest primary peak of the ACF, but it does not show a significant difference from the VBOC(1:1:6,1). However, in the case of the BOC(6,1), there are 22 secondary peaks in which the level of the ACF output exceeds 0.1, whereas in the case of the VBOC(1:1:6,1) of the present exemplary embodiment, there is no secondary peak exceeding 0.1. As the size of the secondary peak in the ACF output is smaller, a code phase error in the acquisition and tracking phases is smaller. Therefore, the code-lock performance of the VBOC(1:1:6,1) signal of the present exemplary embodiment is more excellent than those of the comparative examples.

Figure 6:
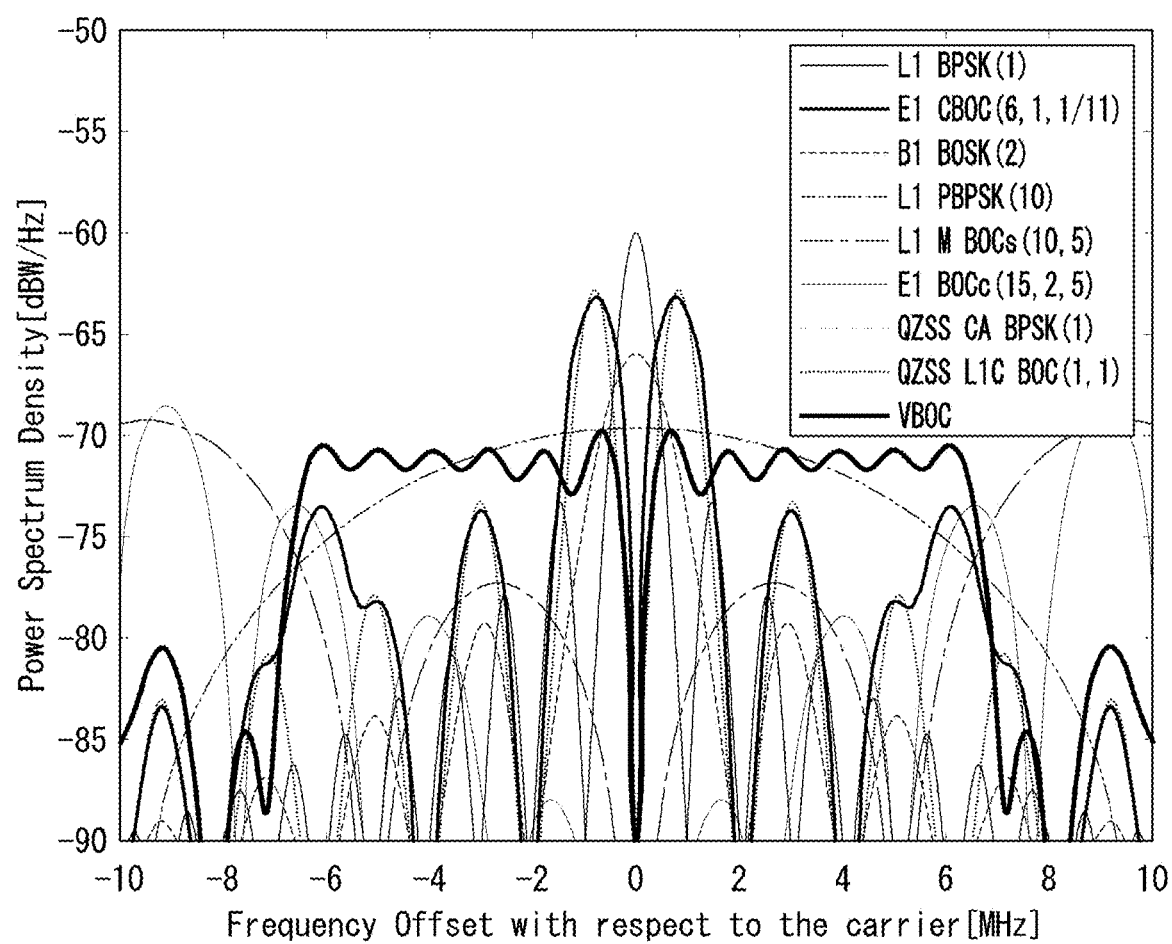
FIG. 6 is an exemplary diagram illustrating multipath error envelopes that can be employed for the VBOC modulation of the satellite navigation signal generator of FIG. 2.

FIG. 6 is an exemplary diagram illustrating multipath error envelopes that can be employed for the VBOC(1:1:6,1) modulation of the satellite navigation signal generator of FIG. 2.

Referring to 6, since the VBOC(1:1:6,1) signal of the exemplary embodiment has a very small error, that is, about 1 m, at a short multipath delay (e.g., multipath delay>40 m) than the BPSK(1), BOC(1,1), BOC(6,1), and CBOC(6,1,1/11) signals of the comparative examples, it can be seen that the modulation method of the present disclosure is much superior to those of the comparative examples.

As described above, it can be confirmed that the modulation method according to the present disclosure is robust in a multipath channel as a next-generation GNSS, and has very little influence of interferences when the proposed signals enter the existing band. In addition, the modulation method according to the present disclosure can analyze the performance of the VBOC signals according to various internal parameters to select and use the optimal parameters, and it is expected that it will also contribute to the improvement of the performance of L6 and S bands in which the next-generation GNSS will operate.

Figure 7:
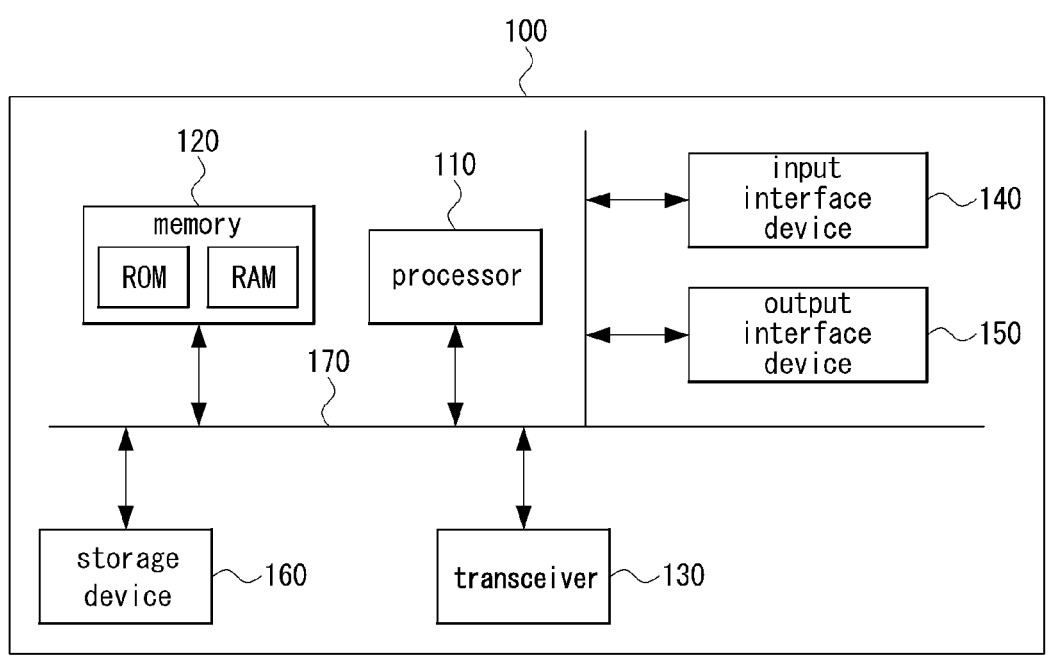
FIG. 7 is a block diagram illustrating a configuration of the satellite navigation signal generator of FIG. 2.

FIG. 7 is a block diagram illustrating a configuration of the satellite navigation signal generator of FIG. 2.

Referring to FIG. 7, a satellite navigation signal generator 300 may be connected to or mounted on a satellite transmitter, a satellite receiver, or a satellite transceiver. The satellite navigation signal generator 300 may include at least one processor 310, a memory 320, and a transceiver 330 connected to a network to perform communications. In addition, the satellite navigation signal generator 300 may further include an input interface device 340, an output interface device 350, a storage device 360, and the like. The respective components included in the satellite navigation signal generator 300 may be connected by a bus 370 to communicate with each other.

The processor 310 may execute program instructions stored in at least one of the memory 320 and the storage device 360. The at least one processor 310 may be a central processing unit (CPU), a graphics processing unit (GPU), or a dedicated processor on which methods according to the exemplary embodiments of the present disclosure are performed.

Each of the memory 320 and the storage device 360 may be configured of at least one of a volatile storage medium and a non-volatile storage medium. For example, the memory 320 may be configured as at least one of a read only memory (ROM) and a random access memory (RAM).

The transceiver 330 may include a sub-communication system supporting a communication connection with a satellite, a sub-communication system supporting wired or wireless communications with a general-purpose base station, and/or a sub-communication system for connections with a mobile edge core network or a core network through an ideal backhaul link or a non-ideal backhaul link. Here, the processor 310 may generate a VBOC-modulated spread signal, transmit the generated VBOC-modulated spread signal to a satellite through the transceiver 330, and may obtain a navigation message by processing a VBOC-modulated spread signal received from the satellite through the transceiver 330.

The input interface device 340 may include at least one selected from input means, such as a keyboard, a microphone, a touchpad, and a touch screen, and an input signal processing unit that maps or processes a signal input through the at least one input means with a pre-stored command.

The output interface device 350 may include an output signal processing unit that maps or processes a signal to be output to a pre-stored signal type or level under the control of the processor 310, and may include at least one output means for outputting signals or information in form of a vibration or light according to the control of the output signal processing unit. The at least one output means may include at least one selected from output means such as a speaker, a display device, a printer, an optical output device, and a vibration output device.

In addition, the program instructions executed by the processor 310 may include instructions for generating navigation message data, instructions for generating a carrier, instructions for generating a VBOC subcarrier, instructions for generating a pseudo-random code, instructions for synthesizing a synthesized signal of the pseudo-random code and the VBOC subcarrier, the carrier, and the navigation message.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

This work was supported by Electronics and Telecommunication Research Institute (ETRI) (20ZH1100, Study on 3D Communication Technology for Hyper-Connectivity).

What is claimed is:

1. A method for modulation of a variable binary offset carrier (VBOC) having a discrete time-variant frequency, the method comprising:
   generating navigation message data;
   generating a carrier;
   generating a VBOC subcarrier;
   generating a pseudo-random code;
   synthesizing the pseudo-random code and the VBOC subcarrier; and
   synthesizing a synthesized signal of the pseudo-random code and the VBOC subcarrier, the carrier, and the navigation message data.

2. The method according to claim 1, wherein the generating of the VBOC subcarrier comprises multiplying an original signal by a square wave with a specific fixed frequency.

3. The method according to claim 1, wherein the generating of the VBOC subcarrier comprises discretely increasing or decreasing a frequency of a binary offset carrier (BOC) signal over time for a specific period.

4. The method according to claim 3, wherein a start frequency, an end frequency, and a frequency interval of the frequency of the BOC signal are control parameters configured for the modulation.

5. A satellite navigation signal generator performing modulation of a variable binary offset carrier (VBOC) having a discrete time-variant frequency, the satellite navigation signal generator comprising:
   a processor; and
   a memory storing program instructions executable by the processor,
   wherein when executed by the processor, the program instructions cause the processor to:
   generate navigation message data;
   generate a carrier;
   generate a VBOC subcarrier;
   generate a pseudo-random code;
   synthesize the pseudo-random code and the VBOC subcarrier; and
   synthesize a synthesized signal of the pseudo-random code and the VBOC subcarrier, the carrier, and the navigation message data.

6. The satellite navigation signal generator according to claim 5, wherein in the generating of the VBOC subcarrier, the program instructions cause the processor to multiply an original signal by a square wave with a specific fixed frequency.

7. The satellite navigation signal generator according to claim 5, wherein in the generating of the VBOC subcarrier, the program instructions cause the processor to discretely increase or decrease a frequency of a binary offset carrier (BOC) signal over time for a specific period.

8. The satellite navigation signal generator according to claim 7, wherein a start frequency, an end frequency, and a frequency interval of the frequency of the BOC signal are control parameters configured for the modulation.

9. A satellite navigation signal generator performing modulation of a variable binary offset carrier (VBOC) having a discrete time-variant frequency, the satellite navigation signal generator comprising:
   a navigation message generating unit configured to generate navigation message data;
   a carrier generating unit configured to generate a carrier;
   a VBOC subcarrier generating unit configured to generate a VBOC subcarrier;
   a pseudo-random code generating unit configured to generate a pseudo-random code;
   a first synthesizing unit configured to synthesize the pseudo-random code and the VBOC subcarrier; and
   a second synthesizing unit configured to synthesize a synthesized signal of the pseudo-random code and the VBOC subcarrier, the carrier, and the navigation message data.

10. The satellite navigation signal generator according to claim 9, wherein the VBOC subcarrier generating unit multiplies an original signal by a square wave with a specific fixed frequency.

11. The satellite navigation signal generator according to claim 9, wherein the VBOC subcarrier generating unit discretely increases or decreases a frequency of a binary offset carrier (BOC) signal over time for a specific period.

12. The satellite navigation signal generator according to claim 11, wherein a start frequency, an end frequency, and a frequency interval of the frequency of the BOC signal are control parameters configured for the modulation.

* * * * *